(12) United States Patent
Nishioka

(10) Patent No.: US 6,268,934 B1
(45) Date of Patent: *Jul. 31, 2001

(54) IMAGE READING APPARATUS

(75) Inventor: Koji Nishioka, Abiko (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/824,019

(22) Filed: Mar. 21, 1997

(30) Foreign Application Priority Data

Mar. 28, 1996 (JP) .................... 8-074329

(51) Int. Cl.[7] ......................................... H04N 1/04
(52) U.S. Cl. .................................. 358/409; 358/412
(58) Field of Search ..................... 358/409, 412, 358/445, 446, 494, 1.5, 1.9, 1.12, 1.18; 395/105, 109, 111, 117

(56) References Cited

U.S. PATENT DOCUMENTS

| | | | |
|---|---|---|---|
| 4,140,903 * | 2/1979 | Clark ........................... | 250/548 |
| 4,254,439 * | 3/1981 | Fowler et al. ................ | 358/410 |
| 4,636,869 * | 1/1987 | Tomohisa et al. ............ | 358/451 |
| 4,687,944 * | 8/1987 | Mitsuka et al. .............. | 358/474 |
| 4,691,237 * | 9/1987 | Shimizu ........................ | 358/409 |
| 4,992,888 * | 2/1991 | Nagashima ................... | 358/410 |
| 5,038,298 * | 8/1991 | Matsumoto et al. .......... | 358/401 |
| 5,047,871 * | 9/1991 | Meyer et al. ................. | 358/486 |
| 5,089,902 * | 2/1992 | Tsubota ........................ | 358/497 |
| 5,157,515 * | 10/1992 | Hasegawa .................... | 358/412 |
| 5,278,675 * | 1/1994 | Kamiyama ................... | 358/412 |
| 5,283,662 * | 2/1994 | Nakajima et al. ............ | 358/409 |
| 5,351,138 * | 9/1994 | Sasaki et al. ................. | 358/462 |
| 5,465,160 * | 11/1995 | Kamo et al. .................. | 358/401 |
| 5,473,413 * | 12/1995 | Hayashi et al. ............... | 358/475 |
| 5,477,342 * | 12/1995 | Sato ............................... | 358/481 |
| 5,481,371 * | 1/1996 | Kamon et al. ................ | 358/410 |
| 5,483,359 * | 1/1996 | Yumiba et al. ............... | 358/513 |
| 5,745,254 * | 4/1998 | Satou ............................ | 358/412 |
| 5,774,248 * | 6/1998 | Komatsu ....................... | 359/204 |
| 5,781,310 * | 7/1998 | Nakamura et al. ........... | 358/409 |
| 5,790,165 * | 8/1998 | Kuboki et al. ................ | 358/296 |

* cited by examiner

Primary Examiner—Yon J. Couso
(74) Attorney, Agent, or Firm—Robin, Blecker & Daley

(57) ABSTRACT

An image reading apparatus is provided with a synchronizing circuit for synchronizing timing of scanning for image reading with timing of driving a pulse motor for the image reading, and a control circuit for variably controlling an output period of the timing of scanning for the image reading, and is arranged to be capable of varying the pitch of image reading at an arbitrary timing.

9 Claims, 7 Drawing Sheets

IMAGE READING APPARATUS

BACKGROUND OF THE INVENTION

1. Field of the Invention

This invention relates to an image reading apparatus such as a facsimile apparatus arranged to be capable of processing image data for communicating or copying the image data.

2. Description of Related Art

Image reading apparatuses, such as facsimile apparatuses, arranged to read image data and to send the image data to a communication line or some other apparatus or to copy the image data are popularly in use.

The image reading apparatus of such a kind is provided with a driving part for feeding an original. A stepping motor (also known as pulse motor) is most popularly employed as a driving motor for use in the driving part, because the stepping motor is easily controllable and gives a high degree of feeding precision.

As for an image reading sensor of the image reading apparatus, a line sensor or the like is employed. Main scanning which is to be made in the horizontal direction of the original is performed by the line sensor, while sub-scanning which is to be made in the vertical direction of the original is performed by feeding the original by the driving part. Thus, the resolution of the image in the main scanning direction is determined according to the number of picture elements of the line sensor, and the resolution of the image in the sub-scanning direction is determined according to the driving pitch of the driving motor of the driving part.

In the meantime, a mm (millimeter) unit system is generally used for defining the image resolution in the direction of sub-scanning, i.e., as a unit system for feeding the original. The driving steps of the pulse motor used for image reading fundamentally corresponds to the density of sub-scanning, and the pulse motor is driven by driving steps in the mm unit system.

FIG. 1 is a block diagram showing in outline the arrangement of a driving system used for sub-scanning in the above-stated image reading apparatus.

Referring to FIG. 1, a pulse motor driving device 1 for feeding the original is composed of a hardware logic circuit which includes a number of counters, registers, etc. A main control part 2 is composed of a microprocessor and is arranged to control actions of the whole apparatus including the pulse motor driving device 1. A pulse motor driving circuit 3 is arranged to drive a pulse motor 4 in accordance with driving data supplied from the pulse motor driving device 1, by applying an exciting output for each phase of the pulse motor 4.

Image scanning means 5 is arranged to read image data on a paper surface being transported by the driving action of the pulse motor 4. The image scanning means 5 includes a scanner part 6 which is provided with a line sensor, etc., for horizontally scanning the image of the original, and a paper sensor 7 which is arranged to detect the original being transported by the pulse motor 4. These parts are respectively arranged to operate under the control of the main control part 2.

A RAM (random access memory) 8 stores data which can be set as desired by the operator of the apparatus. A ROM (read only memory) 9 stores beforehand a program, a message of the operator, etc., for controlling the main control part 2 which is composed of a microprocessor, etc. Reference numeral 10 denotes the entirety of an image communication apparatus, such as a facsimile apparatus, configured as described above.

FIG. 2 schematically shows in a block diagram the internal arrangement of the pulse motor driving device 1. Referring to FIG. 2, a synchronizing circuit 11 is arranged to synchronize with each other an image scan timing signal for scanning an image by the line sensor and a driving trigger signal for the pulse motor 4 for feeding the original. The synchronizing circuit 11 operates under the control of a clock signal (clk) supplied from a clock signal oscillator (not shown). A motor counter 12 is arranged to count the pulses of a motor driving pulse signal outputted from the synchronizing circuit 11 for actually driving the pulse motor 4. An exciting pattern selector part 13 is arranged to select and output driving waveform data for actually driving the pulse motor 4 on the basis of the output of the motor counter 12. An exciting pattern storing part 14 is arranged to store the exciting pattern for driving the pulse motor 4.

FIG. 3 is a timing chart showing the actual actions of the device shown in FIG. 2 in the above-stated mm unit system. Referring to FIG. 3, the image scan timing signal for image reading is inputted in a predetermined cycle. The driving trigger signal for feeding the original is inputted at random. An actual motor driving signal, i.e., a timing signal for feeding the original, is formed by synchronizing with each other the image scan timing signal and the driving trigger signal. An image reading action in the mm unit system is performed while feeding the original at a pitch in the mm unit system according to the actual motor driving signal.

The image reading can be accurately carried out in the mm unit system. However, at present, a unit called "DPI" (dot per inch) is most popularly used as the unit of image resolution for business machines such as copying machines, peripheral apparatuses for computers, etc., that is, an inch unit system is generally used for the image resolution. Therefore, in a case where an image read out by a facsimile apparatus or the like is to be recorded by a peripheral apparatus operating in the inch unit system, it has been practiced in general to carry out a mm/inch conversion process (conversion from the mm unit system to the inch unit system) either by a software process or a hardware process before recording, because pitches in the sub-scanning direction of these apparatuses would not match with each other without the mm/inch conversion process.

However, according to the conventional method mentioned above, the resolution obtained at the time of image reading is in the mm unit system and the data matching to the inch unit system is formed by the image processing action. The recording is thus performed not by exactly reading the image with its resolution in the inch unit system. Therefore, it has been desired to have an apparatus which is capable of carrying out the above-stated conversion in cases where an image must be obtained with its resolution in the inch unit system at the time of reading, that is, in cases where the image is to be copied or the image data is to be supplied to a peripheral apparatus or where the image data is to be outputted without recourse to a telephone line.

BRIEF SUMMARY OF THE INVENTION

This invention is directed to the solution of the above-stated problem. It is, therefore, a first object of this invention to provide an image reading apparatus which is capable of varying the resolution of image reading without disturbing the image.

It is a second object of this invention to provide an image reading apparatus which is capable of reading images with a high degree of precision without bringing about any discontinuous parts in the image even when the timing of transporting the original is changed.

It is a third object of this invention to provide an image reading apparatus which is capable of reading images with a high degree of precision without disturbing the image even at the time of restart after the process of image reading is put to pause.

To attain the above-stated objects, an image reading apparatus according to this invention as a preferred embodiment thereof comprises a synchronizing circuit for synchronizing timing of scanning for image reading with timing of driving a pulse motor for the image reading, and a control circuit for variably controlling an output period of the timing of scanning for the image reading.

Further, an image reading apparatus according to a preferred embodiment of this invention is arranged such that, in reading an image in an inch unit system with an apparatus in which a mm unit system is used for the timing of driving a pulse motor and the timing of scanning images, the image reading apparatus is capable of reading image data at a resolution of the inch unit system with a high degree of precision even when the process of image reading is put to pause by some reason.

These and other objects and features of this invention will become apparent from the following detailed description of an embodiment thereof taken in connection with the accompanying drawings.

DETAILED DESCRIPTION OF THE INVENTION

Hereinafter, a preferred embodiment of an image reading apparatus according to this invention will be described in detail with reference to the accompanying drawings.

An image reading apparatus capable of feeding an original both in an mm unit system and in an inch unit system is described first with reference to FIGS. 4 and 5 as follows.

Figure 1:
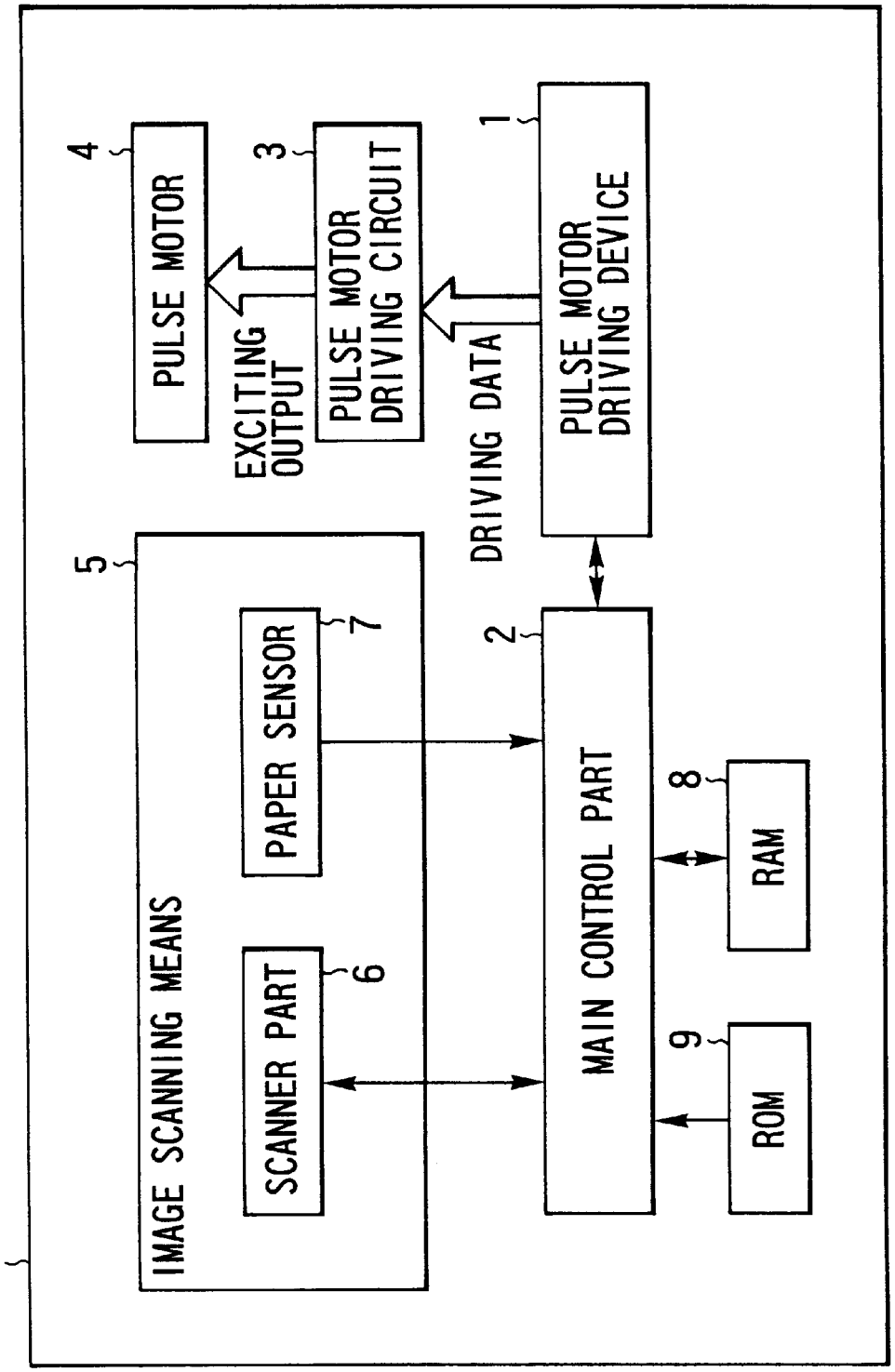
FIG. 1 is a block diagram showing the fundamental arrangement of an image reading apparatus.
Figure 2:
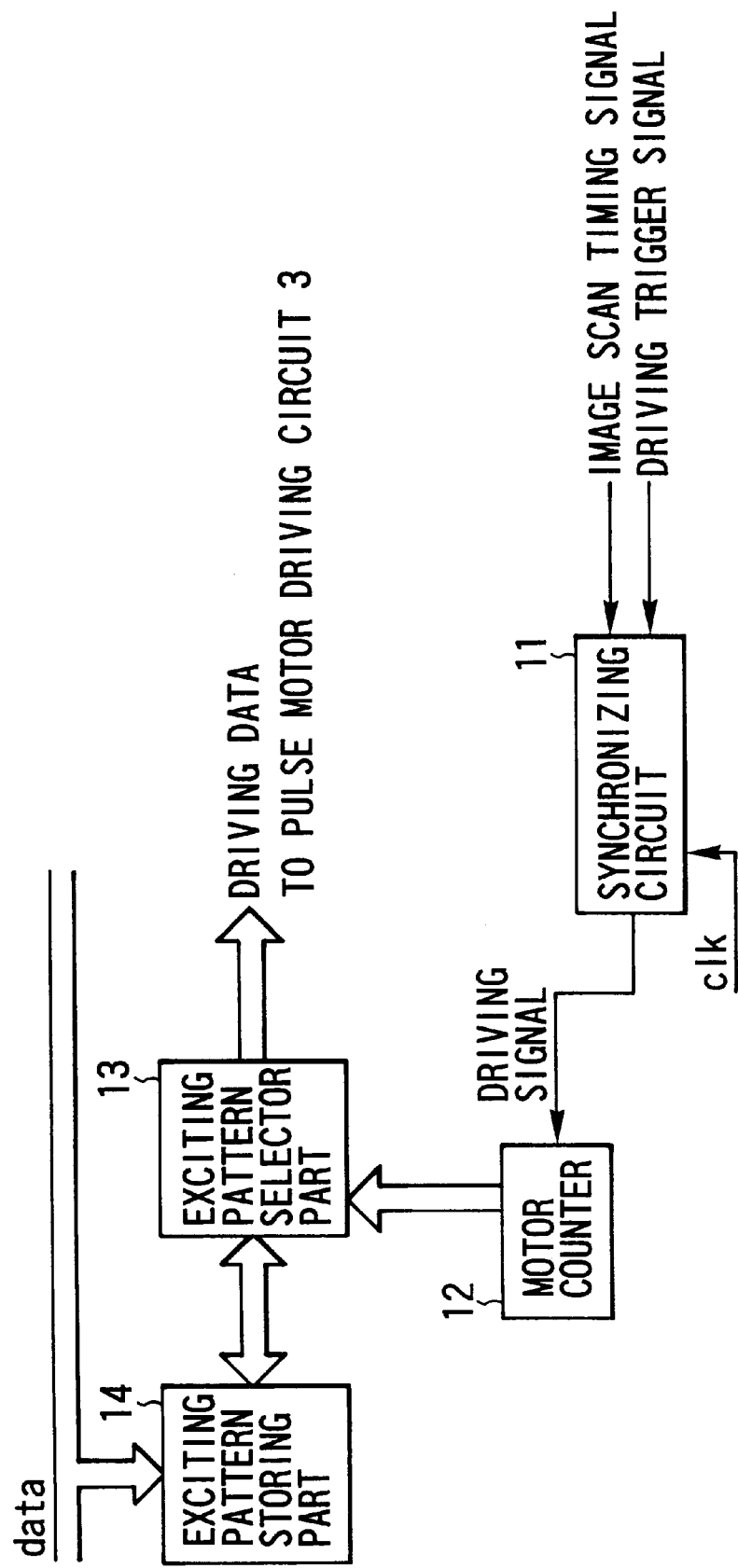
FIG. 2 is a block diagram showing the arrangement of a conventional motor driving device of the image reading apparatus.
Figure 4:
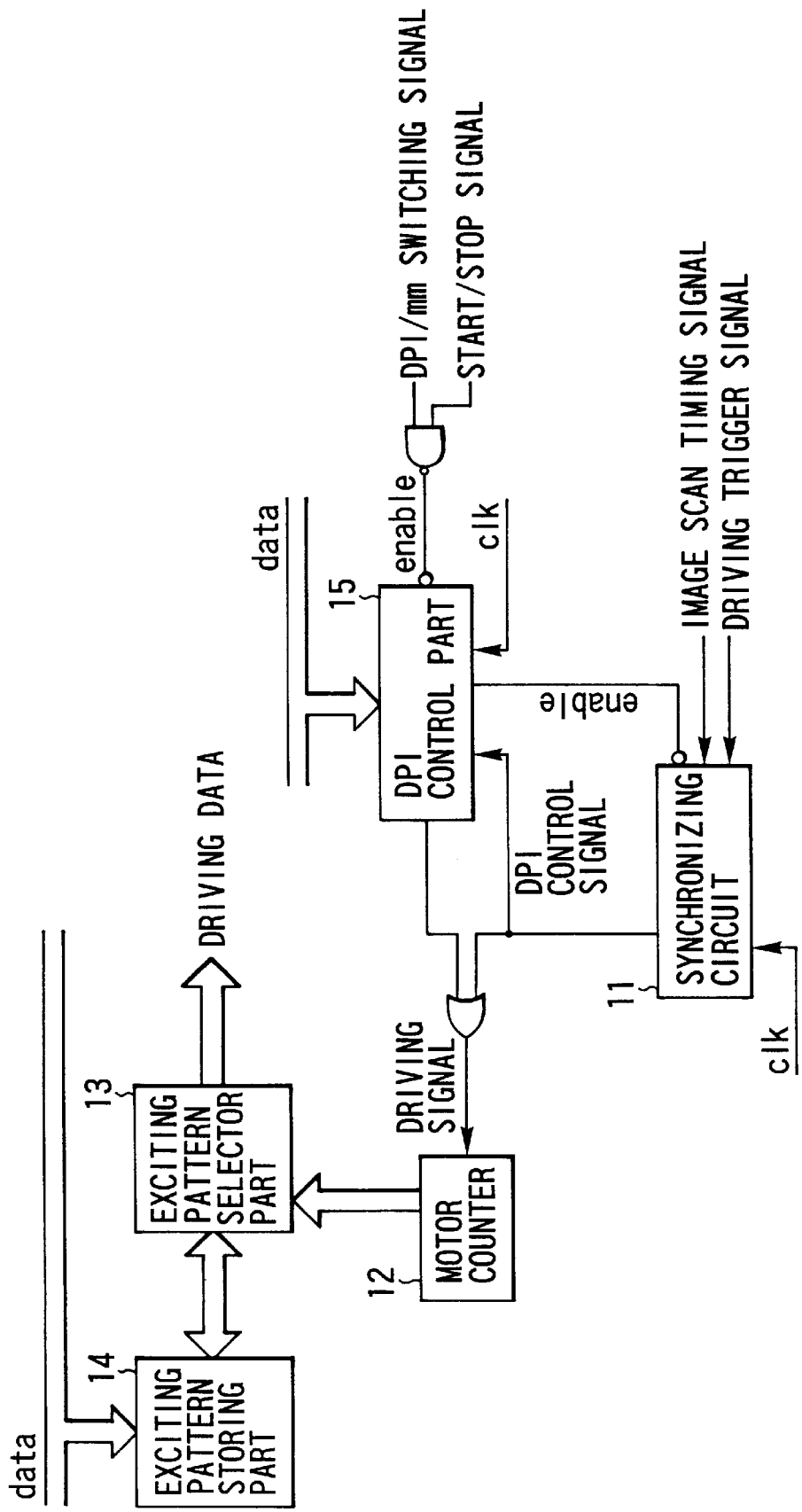
FIG. 4 is a block diagram showing by way of example the arrangement of a motor driving device of an image reading apparatus capable of varying the timing of driving.

While the fundamental arrangement of such an image reading apparatus is similar to that shown in FIG. 1, a pulse motor driving device 1 of the apparatus is configured as shown in FIG. 4. In FIG. 4, parts indicated by the same reference numerals as those shown in FIG. 2 are the same as those shown in FIG. 2. A DPI (dot per inch) control part 15, which includes a DPI counter, etc., is arranged to operate according to a DPI/mm switching signal and a start/stop signal for performing switching between feeding in the inch unit system and feeding in the mm unit system in a case where images are to be read in the inch unit system.

In the above-described arrangement, in the apparatus having an image scan timing and a driving trigger in the mm unit system, a pulse motor driving signal in the inch unit system is formed by a hardware process using the DPI counter included in the DPI control part 15, which is discretely arranged for the inch unit system. A start of the DPI counter is arranged to be triggered by a DPI control signal which is outputted from the synchronizing circuit 11. While the DPI control part 15 is in process of performing the DPI control, no driving signal is outputted from the synchronizing circuit 11. The pulse motor is driven at a pitch in the inch unit system by using a count signal of the DPI counter included in the DPI control part 15, while an image is taken in by the image scan timing in the mm unit system. This operation enables image data to be read and supplied to a recording system in a manner adequately matched with the inch unit system.

Figure 3:
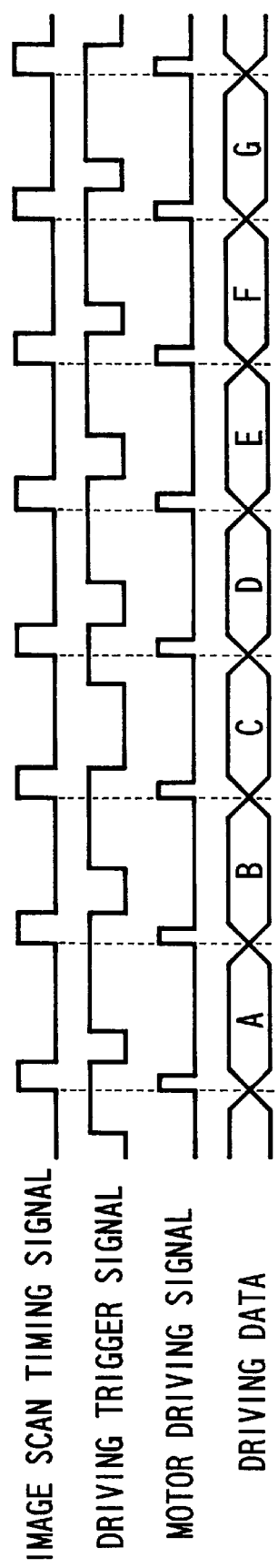
FIG. 3 is a timing chart showing actions of the motor driving device shown in FIG. 2.
Figure 5:
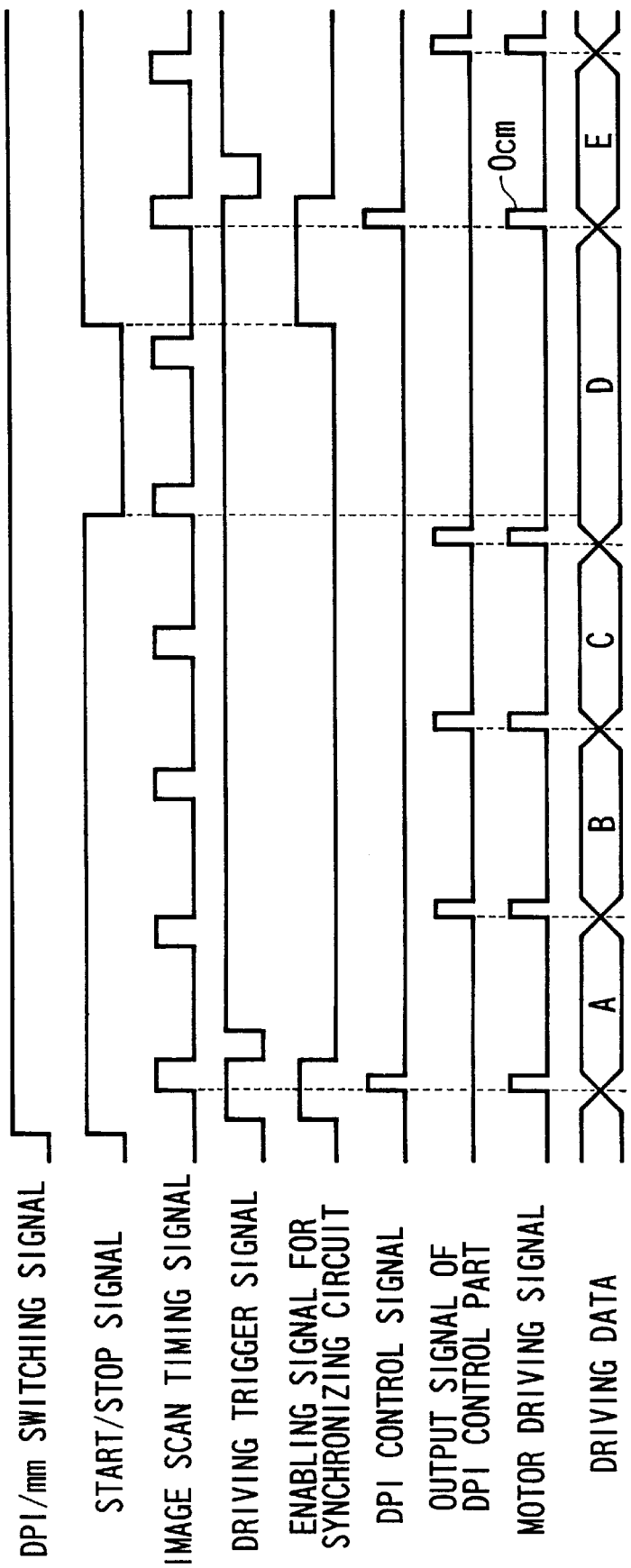
FIG. 5 is a timing chart showing actions of the motor driving device shown in FIG. 4.

FIG. 5 shows in a timing chart the actions of the device shown in FIG. 4. Referring to FIG. 5, a driving signal for the first time, i.e., a DPI control signal, is outputted from the synchronizing circuit 11 by synchronizing with each other the image scan timing signal which is inputted in a predetermined cycle and the driving trigger signal which is inputted at random, as in the case of FIG. 3. At this point of time, the DPI/mm switching signal is at a high level to select the DPI control and the start/stop signal is at a high level to effect a start. Therefore, after this point of time, the output of the synchronizing circuit 11 is disregarded, and the output of the DPI counter is used as a driving signal with the first driving signal from the synchronizing circuit 11 used as a trigger. In this instance, image reading in the inch unit system can be carried out with a high degree of precision by setting the DPI counter at a desired DPI setting value.

As described above, there is provided with a timer means which is arranged independently of the mm unit system, so that even an apparatus in the mm unit system can carry out a process in the inch unit system at a high degree of precision. In FIG. 5, reference symbol "Ocm" denotes an output synchronized with the mm unit system.

However, with the image reading apparatus arranged as described above, since the driving trigger signal for the pulse motor and the image scan timing signal are in the mm unit system while the actual driving signal for the pulse motor is in the inch unit system, there arises some discrepancy between the driving trigger of the apparatus and the actual driving trigger.

Further, since the motor driving signal in the inch unit system is outputted from a discrete timer (counter), the driving position of the motor cannot be managed at the image reading apparatus by using the driving signal of the image reading apparatus. Therefore, when the motor happens to be restarted for resuming the image reading after the driving of the motor is suspended by some cause during the image reading, a motor driving trigger in the mm unit system under the control of the image reading apparatus must be used as the restart trigger signal for the motor.

Therefore, as shown in FIG. 5, the trigger signal in the mm unit system, i.e., the DPI control signal, must always be used to trigger the driving of the motor also in the event of a restart of the motor. In the event of a suspension of the driving of the motor, therefore, it is impossible to accurately read images in the inch unit system because of occurrence of a discontinuous part such as an image deviation at a portion where the restart of the motor is effected.

An image reading apparatus to be described below is arranged to solve the above-stated problem.

Figure 6:
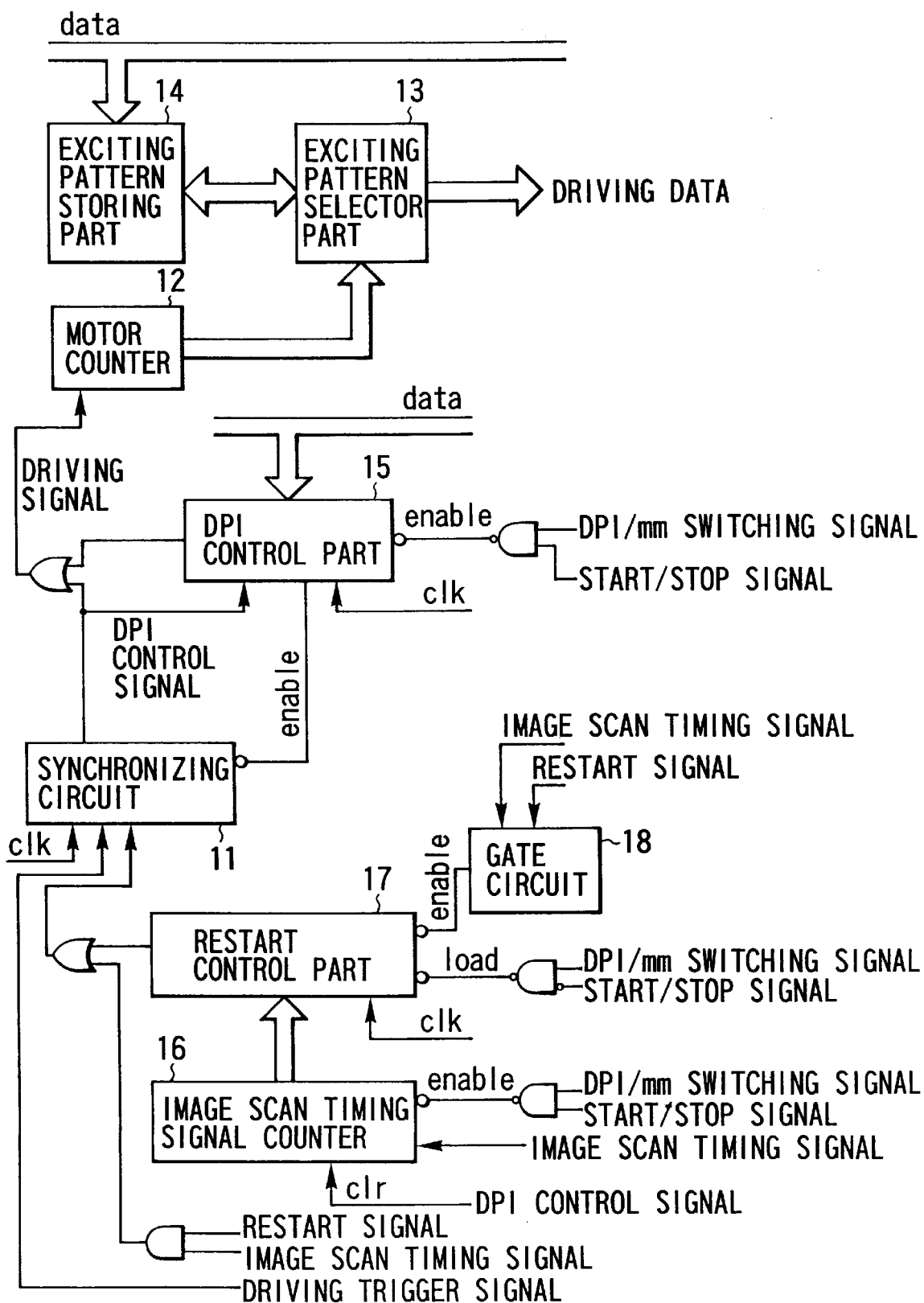
FIG. 6 is a block diagram showing the arrangement of an image reading apparatus most adequately representing the features of this invention.

FIG. 6 is a block diagram showing most adequately the above-stated feature of the image reading apparatus. The fundamental arrangement of the entirety of the image reading apparatus is the same as that shown in FIG. 1 and is, therefore, omitted from the following description. This invention is applied to the internal arrangement of the pulse motor driving device 1 shown in FIG. 1 in a manner as shown in FIG. 6.

Referring to FIG. 6, reference numerals 11, 12, 13, 14 and 15 denote parts which are the same as those shown in FIG. 4 and, therefore, the details of them are omitted from the following description. An image scan timing signal counter 16 is arranged to count the pulses of the image scan timing signal obtained after the commencement of driving of the pulse motor 4 during the DPI control (when the DPI/mm switching signal is at a high level). A restart control part 17 is arranged to supply to the synchronizing circuit 11 a trigger signal for restarting (i.e., restarting after a temporary stop) the pulse motor 4 according to the count value of the image scan timing signal counter 16. A gate circuit (selection means) 18 is arranged to control an enabling signal for enabling the restart control part 17. The gate circuit 18 outputs the enabling signal so as to render the restart control part 17 operative, when a restart signal for restarting the pulse motor 4 (at a low level for a restart) and the image scan timing signal generated for the first time after the restart signal are inputted to the gate circuit 18 from on the side of the image reading apparatus. Except for these parts, the arrangement of the pulse motor driving device is the same as the arrangement shown in FIG. 4.

Figure 7:
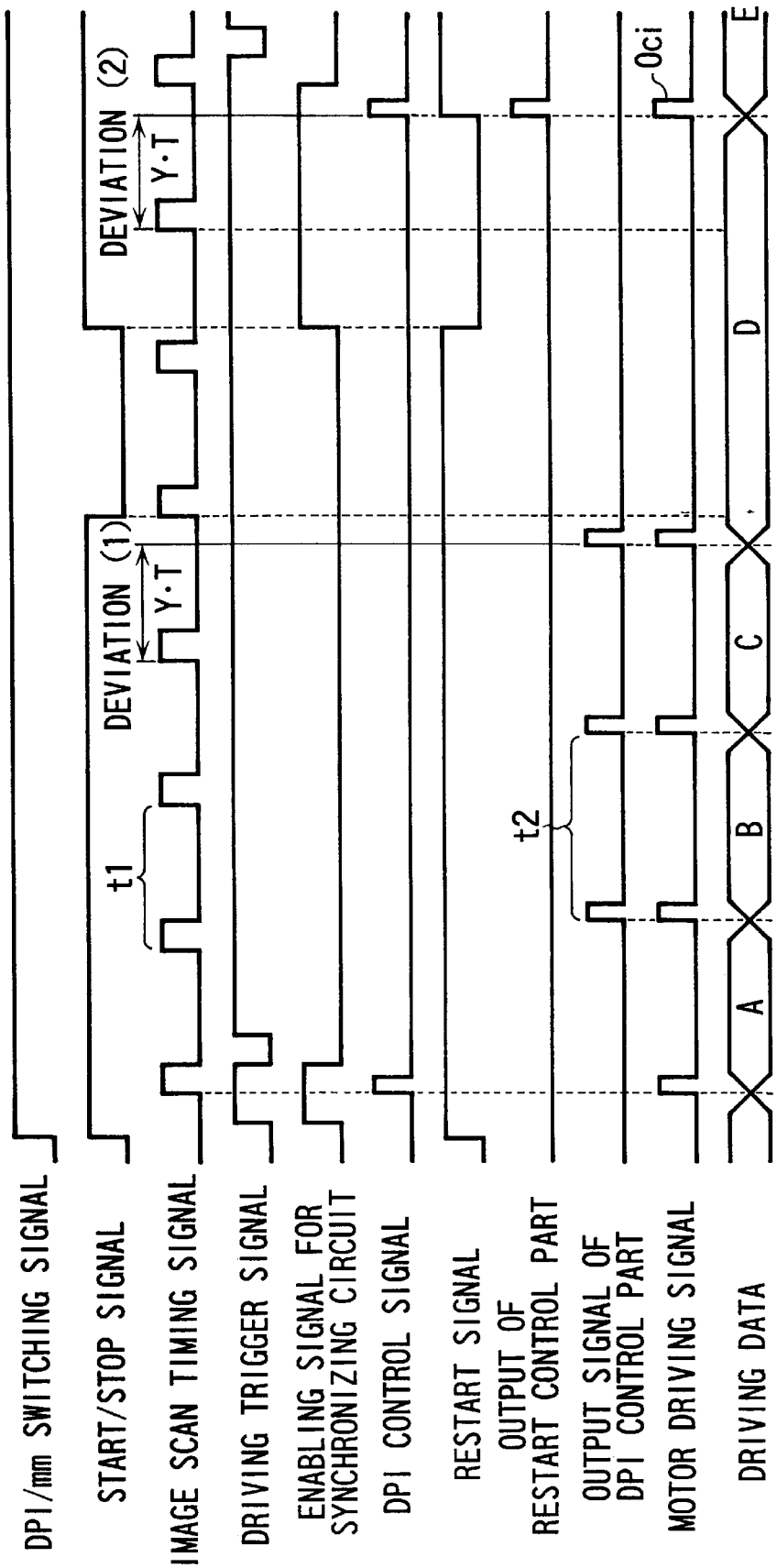
FIG. 7 is a timing chart showing actions of the image reading apparatus shown in FIG. 6.

Operation of the embodiment of this invention is next described with reference to the timing chart of FIG. 7. The fundamental operation timing is the same as that shown in FIG. 5. As shown in FIG. 7, the synchronizing circuit 11 outputs the first driving signal, i.e., a DPI control signal, which is obtained by synchronizing with each other the image scan timing signal which is inputted in a predetermined cycle and the driving trigger signal which is inputted at random for driving the pulse motor 4.

At this point of time, the DPI/mm switching signal is at a high level to select the DPI control, the start/stop signal is at a high level to effect a start, and the restart signal is at a high level (negative). Therefore, after this point of time, the output of the synchronizing circuit 11 is disregarded, and the output of the DPI counter included in the DPI control part 15 is used as a driving signal with the first driving signal from the synchronizing circuit 11 used as a trigger. In this instance, image reading in the inch unit system can be carried out by setting the DPI counter at a desired DPI setting value.

With the motor started under the DPI control, the pulses of the image scan timing signal inputted in a predetermined cycle while the motor is in operation are counted by the image scan timing signal counter 16.

In a case where the start/stop signal is caused to become a low level to indicate stopping of the motor by some cause or in accordance with an instruction while the motor is in operation, that is, when an instruction for a stop is issued, the DPI control part 15 is stopped from operating and the restart control part 17 is loaded with the count value of the image scan timing signal counter 16.

Then, when the start/stop signal becomes a high level thus indicating starting of the motor, that is, upon receipt of an instruction for releasing the motor from its stopped state, this instruction acts as a trigger to cause the restart signal to be active (at a low level). The restart signal renders the restart control part 17 operative. The restart control part 17 then corrects a deviation of the motor driving signal from the image scan timing signal taking place up to the time of stopping of the motor, on the basis of data of the count value of the image scan timing signal received from the image scan timing signal counter 16.

Specifically, since the image scan timing signal is asynchronous with the motor driving signal in the inch unit system, the amount of deviation between the image scan timing signal and the motor driving signal is inconstant and varies every time the image scan timing signal is outputted.

To solve this problem, therefore, the pulses of the image scan timing signal are counted after the start of the motor so as to make it possible to compute and obtain the amount of deviation existing at the point of time of stopping of the motor. At the time of the restart after the stop of the motor, the computed amount of deviation is used as an initial value, so that the image scanning can be resumed to continue from a point where it has been put to pause.

Assuming that the time of the image scan timing, i.e., the time value of intervals of the image scan timing signal, in the mm unit system is t1 seconds, the time value of intervals of the motor driving signal in the inch unit system is t2 seconds, the period of the clock signal of the apparatus is T, the output value of the image scan timing signal counter 16 is X, the above-stated deviation as reduced to the number of pulses Y of the clock signal of the apparatus can be expressed as follows:

$$Y=|t2-t1| \cdot X/T$$

More specifically, the difference in time between the image scan timing signal and the motor driving signal increases by $|t2-t1|$ every time the image scan timing signal is outputted. Therefore, when the image scan timing signal has been outputted X times (pulses), the total amount of deviation becomes $|t2-t1| \cdot X$.

Accordingly, the arrangement for counting the pulses of the image scan timing signal after a start of the image reading action and storing a count value obtained at a point of time when the image reading action comes to a stop makes it possible to reproduce without difficulty an amount of deviation existing at that point of time between the image scan timing signal and the motor driving signal.

The amount of deviation can be expressed in the number of system clock pulses Y of a period T of a computer as $Y=|t2-t1| \cdot X/T$, as mentioned above. In FIG. 7, since an abscissa axis shows time, the amount of deviation is expressed by the length of time of deviation Y·T.

At the time of the restart of the motor, the amount of deviation Y·T is obtained on the basis of a count value of the image scan timing signal counter 16. Then, the motor driving signal (in the inch unit system) is caused to be generated later by the length of time Y·T than the pulse of the image scan timing signal first obtained after the restart. This arrangement makes it possible to continue the image reading action at the same timing obtained before the suspension of the action.

Therefore, the deviation of image reading which exists at the time of the restart of the motor can be corrected by shifting the timing of a trigger for starting the motor at the time of the restart to an extent as much as the length of time of the deviation taking place up to the time when the motor is brought to a stop and by outputting the trigger from the restart control part 17. In FIG. 7, reference symbol "Oci" denotes an output obtained by correction to the inch unit system.

As described above, according to the embodiment, in the event of the image reading in the inch unit system by using an image reading apparatus of the kind having the pulse motor driving timing and the image scan timing both in the mm unit system, it is possible to accurately read image data of resolution in the inch unit system. For this purpose, according to the embodiment, even when the process of the image reading is to be restarted after the process of the image reading is caused to be suspended by some reason, an amount of deviation of the motor driving signal from the image scan timing signal existing when the motor is brought to a stop is computed and the timing of restarting the motor is shifted as much as the computed amount of deviation at the time of the restart of the process of the image reading.

What is claimed is:

1. An image reading apparatus comprising:
   a) image reading means;
   b) driving means for moving said image reading means and an object relative to each other at a pitch corresponding to a predetermined driving unit system;
   c) detecting means for detecting an amount of deviation between an image reading timing signal for said image reading means and a driving timing signal for said driving means; and
   d) control means for holding an output of said detecting means in case that said driving means has stopped and for providing the driving timing signal to said driving means so as to keep the amount of deviation in a case that said driving means restarts.

2. An apparatus according to claim 1, wherein said control means holds said output when the driving unit system is changed from a mm unit system to an inch unit system.

3. An apparatus according to claim 2, wherein said control means counts the image reading timing signal and computes the amount of deviation according to a count value thus obtained.

4. An apparatus according to claim 1, wherein said image reading means is a line sensor, said object is an original image, and said driving means includes a pulse motor.

5. An image reading method comprising:
   a) image reading with an image reading means;
   b) moving with a driving means said image reading means and an object relative to each other at a pitch corresponding to a predetermined driving unit system;
   c) detecting an amount of deviation between an image reading timing signal for said image reading means and a driving timing signal for said driving means; and
   d) holding an output obtained in said detecting step in case that said driving means has stopped and providing the driving timing signal to said driving means so as to keep the amount of deviation in a case that said driving means restarts.

6. A method according to claim 5, wherein said detecting step detects said amount of deviation when the driving pitch is changed.

7. A method according to claim 6, wherein said holding step holds said output when the driving unit system is changed from a mm unit system to an inch unit system.

8. A method according to claim 7, wherein said holding step counts the image reading timing signal and computes the amount of deviation according to a count value thus obtained.

9. A method according to claim 8, wherein said image reading means is a line sensor, said object is an original image, and said driving means includes a pulse motor.

* * * * *

UNITED STATES PATENT AND TRADEMARK OFFICE
CERTIFICATE OF CORRECTION

PATENT NO. : 6,268,934 B1
DATED : July 31, 2001
INVENTOR(S) : Koji Nishioka

It is certified that error appears in the above-identified patent and that said Letters Patent is hereby corrected as shown below:

<u>Title page,</u>
Item [54], after "IMAGE READING APPARATUS" insert -- WITH SELECTABLE SUBSCANNING AND RESTART --.

Signed and Sealed this

Second Day of July, 2002

*Attest:*

JAMES E. ROGAN
*Attesting Officer*  *Director of the United States Patent and Trademark Office*